United States Patent [19]

Suzuki et al.

[11] Patent Number: 4,984,507
[45] Date of Patent: Jan. 15, 1991

[54] THREE CHAMBER BRAKE BOOSTER WITH VARIABLE PRESSURE PASSAGES HAVING A MINIMUM CHANNEL LENGTH

[75] Inventors: Haruo Suzuki; Tohru Satoh, both of Saitama, Japan

[73] Assignee: Jidosha Kiki Co., Ltd., Tokyo, Japan

[21] Appl. No.: 380,986

[22] Filed: Jul. 17, 1989

[30] Foreign Application Priority Data

Jul. 26, 1988 [JP] Japan .................................. 63-186634
Oct. 24, 1988 [JP] Japan .................................. 63-267575

[51] Int. Cl.⁵ ............................................. F15B 9/10
[52] U.S. Cl. ..................................... 91/376 R; 92/49; 92/98 D; 92/169.1
[58] Field of Search ................... 91/376 R; 92/48, 49, 92/98 R, 98 D, 169.1, 169.2

[56] References Cited

U.S. PATENT DOCUMENTS

| 3,103,855 | 9/1963 | Hager et al. | 92/48 |
| 4,512,237 | 4/1985 | Endoh et al. | 92/48 X |
| 4,596,178 | 6/1986 | Sugiura | 92/48 |
| 4,747,336 | 5/1988 | Uyama | 91/376 R |
| 4,787,292 | 11/1988 | Tsuyuki et al. | 91/376 R X |
| 4,794,849 | 1/1989 | Kobayashi | 92/169.1 X |
| 4,811,653 | 3/1989 | Kobayashi et al. | 92/98 D |
| 4,813,337 | 3/1989 | Endo | 91/376 R X |
| 4,882,980 | 11/1989 | Arino et al. | 92/48 |

FOREIGN PATENT DOCUMENTS 44-9770   5/1969  Japan .
53-23913  7/1978  Japan .
60-154952 8/1985  Japan .

Primary Examiner—Edward K. Look
Assistant Examiner—John Ryznic
Attorney, Agent, or Firm—Flynn, Thiel, Boutell & Tanis

[57] ABSTRACT

A brake booster of triple type comprises a shell in which constant pressure and variable pressure chambers are formed. According to the invention, individual variable pressure chambers defined within the shell communicate with a valve mechanism through respective variable pressure passages having a minimum channel length. In this manner, hydraulic fluid contained within the respective variable pressure chambers which communicate with the associated variable pressure passages can be rapidly displaced through the valve mechanism, thus preventing an operational lag in terminating the brake action in a favorable manner.

7 Claims, 3 Drawing Sheets

4,984,507

THREE CHAMBER BRAKE BOOSTER WITH VARIABLE PRESSURE PASSAGES HAVING A MINIMUM CHANNEL LENGTH

FIELD OF THE INVENTION

The invention relates to a brake booster including a constant pressure chamber and a variable pressure chamber defined within a shell.

DESCRIPTION OF THE PRIOR ART

A brake booster usually includes a pair of constant and variable pressure chambers defined within a shell across a combination of a power piston and a diaphragms, and a negative pressure is introduced into the both chambers in its inoperative condition in which there is no depression of a brake pedal.

However, upon depression of the brake pedal, an atmospheric pressure is introduced into the variable pressure chamber in accordance with the degree of depression of the brake pedal while maintaining the negative pressure within the constant pressure so that a fluid pressure differential is developed across the power piston to cause a forward movement of the piston and its connected push rod, thereby causing the push rod to advance a piston of a master cylinder in order to produce a brake liquid pressure therein.

In a brake booster of the kind described an output can be increased by increasing the effective pressure responsive area of the power piston. However, if the diameter of the power piston increases, this causes a corresponding increase in the diameter of the brake booster which may then be unable to be mounted on a vehicle depending on the variety of vehicles.

To accommodate for this, there has been proposed a tandem brake booster in which two pairs of constant and variable pressure chambers are disposed seriatim within the shell (see Japanese Pat. Publications No. 9,770/1969 and No. 23,913/1978 and Japanese Laid-Open patent application Ser. No. 154,952/1985). The tandem brake booster permits the output to be increased without accompanying an increase in the diameter even though the axial length increases, and thus can be mounted on those vehicles on which a brake booster having an increased diameter cannot be mounted. However, if a greater output from a tandem brake booster is desired, it is inevitable to increase the diameter further, again causing the likelihood that a resulting tandem brake booster with an increased diameter cannot be mounted on certain vehicles.

Such difficulty can be overcome by providing a brake booster of triple type in which three pairs of constant and variable pressure chambers are disposed seriatim within the shell. Specifically, there may be provided a brake booster comprising a front plate and a rear plate which are fixedly disposed within a shell to divide the interior of the shell into a front chamber, a center chamber and a rear chamber; a valve body slidably extending through the front plate and the rear plate; a front power piston, a center power piston and a rear power piston disposed within the front chamber, the center chamber and the rear chamber, respectively, and connected to the valve body; a front diaphragm, a center diaphragm and a rear diaphragm applied to the back side of each of the front power piston, the center power piston and the rear power piston for dividing the interior of each of the front chamber, the center chamber and the rear chamber into a forwardly disposed, constant pressure chamber and a rearwardly disposed, variable pressure chamber; a constant pressure passage for providing a communication between the constant pressure chambers which are defined within the front chamber, the center chamber and the rear chamber; a variable pressure passage for providing a communication between the respective variable pressure chambers defined in the interior of the front chamber, the center chamber and the rear chamber; a valve mechanism contained within the valve body for switching a communication between the constant pressure passage, the variable pressure passage and a pressure passage which supplies a pressure fluid; and an input shaft connected to a brake pedal for reciprocatory motion for switching a fluid path within the valve mechanism as the pedal is operated.

With a brake booster of triple type mentioned above, a pair of constant and variable pressure chambers are defined across each of the front power piston, the center power piston and the rear power piston, so that as compared with a tandem brake booster, the total effective pressure responsive area can be increased without accompanying an increase in the diameter, thus allowing a desired output of an increased magnitude to be obtained while maintaining a small external diameter of the brake booster. Thus, such booster may be mounted on those vehicles on which a brake booster of an increased diameter cannot be mounted.

In the brake booster of triple type mentioned above, if an arrangement is made such that a hydraulic fluid is introduced into the variable pressure chamber of the rear chamber through the valve mechanism, and is then introduced into the variable pressure chambers of the center chamber and the front chamber through the variable pressure passage which is formed in the valve body, it will be seen that there results an increased distance between the front chamber and the rear chamber, requiring an increased length of the variable pressure passage which is axially formed in the valve body. This causes a difficulty that the pressure fluid may not be displaced smoothly when the pressure fluid which has been supplied to the variable pressure chamber of the front chamber is to be displaced to the variable pressure chamber of the rear chamber through the variable pressure passage, giving rise to the likelihood that an operational lag may result in terminating the brake operation.

In addition, with a triple type arrangement, there are difficulties in providing means which secure the front and the rear plate to the shell and means for securing beads extending around the periphery of the front, the center and the rear diaphragm to the shell. If appropriate means are not provided, there occurs a possibility that the assembling operation of the brake booster may be hampered with.

SUMMARY OF THE INVENTION

In view of the foregoing, the invention provides a brake booster of triple type as mentioned above in which the variable pressure passage comprises a first variable pressure passage which provides a communication between the variable pressure chamber of the center chamber and the valve mechanism, a second variable pressure passage providing a communication between the variable pressure chamber of the front chamber and the valve mechanism and a third variable pressure passage providing a communication between the variable pressure chamber of the rear chamber and the valve mechanism, with the channel length of the first variable pressure passage being less than any other variable pressure passages.

With this arrangement, the variable pressure chamber of the center chamber will communicate with the valve mechanism through the first variable pressure passage which provides a minimum distance, and since this variable pressure chamber is located intermediate the variable pressure chambers of the front and the rear chamber, the channel length of the first and the third variable pressure passage can be chosen to be equal to each other, with consequence that these variable pressure chambers communicate with the valve mechanism through the individual variable pressure passages each with a minimum channel length.

Accordingly, when the pressure fluid which has been supplied to the individual variable pressure chambers are to be displaced through the associated variable pressure passages, the displacement takes place rapidly, thus favorably preventing an operational lag in terminating a brake action.

The shell may comprise a cup-shaped, front shell section and a rear shell section which closes the opening of the front shell section, with the combination of the front shell section and the front plate holding a bead extending around the outer perimeter of the front diaphragm therebetween, with the combination of the front plate and the rear plate holding a bead extending around the outer perimeter of the center diaphragm therebetween and also with the combination of the rear plate and the rear shell section holding a bead extending around the outer perimeter of the rear diaphragm therebetween. In addition, the front plate is held between and supported by the front shell section and the rear plate while the rear plate is held between and supported by the front plate or the front shell section and the rear shell section. The rear shell section may be connected to the front shell section to connect the front shell section, the front plate, the rear plate and the rear shell section together in an integral manner. When the front diaphragm is received within the cup-shaped front shell section, the front plate may be fitted into the front shell section so that the bead extending around the outer perimeter of the front diaphragm may be held between the front shell section and the front plate.

Subsequently when the center diaphragm is received within the front shell section, the rear plate may be fitted into the front shell section so that the bead extending around the outer perimeter of the center diaphragm may be held between the front plate and the rear plate. At the same time, the front plate may be supported by the rear plate. Finally, the bead extending around the outer perimeter of the rear diaphragm is held between the rear plate and the rear shell section while the rear plate may be connected to the rear shell section to provide a connection between the front and the rear shell section, whereby the front shell section, the front plate, the rear plate and the rear shell section can be integrally connected together.

Accordingly, during the assembly, the front diaphragm, the front plate, the center diaphragm, the rear plate and the rear diaphragm may be sequentially brought into the front shell section and then the rear shell section may be connected thereto, thus greatly facilitating the assembling operation.

Above and other objects, features and advantages of the invention will become apparent from the following description of several embodiments thereof with reference to the attached drawings.

DETAILED DESCRIPTION OF EMBODIMENTS

Figure 1:
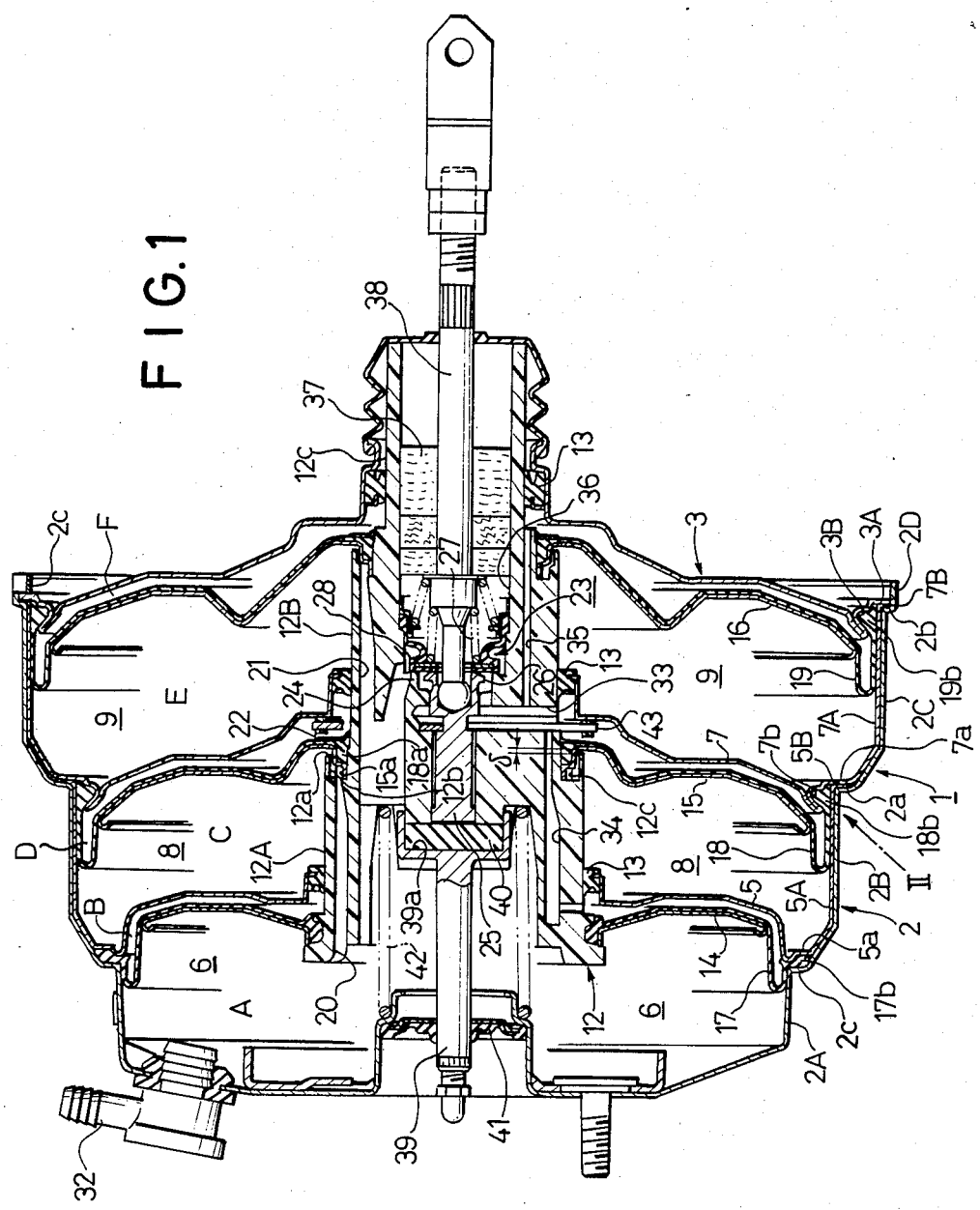
FIG. 1 is a side elevation, largely in longitudinal section, of one embodiment of the invention.
Figure 2:
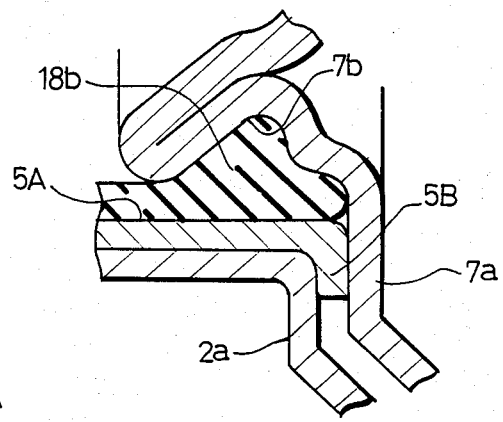
FIG. 2 is a section, to an enlarged scale, of a region generally indicated by an arrow II in FIG. 1.
Figure 4:
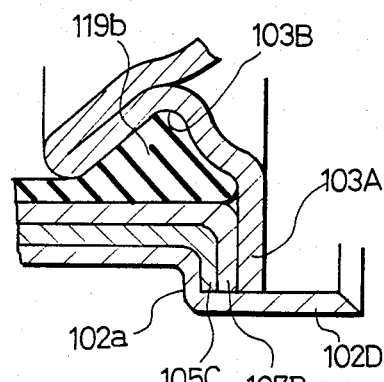
FIG. 4 is an enlarged view of a region indicated by an arrow IV shown in FIG. 3.

Referring to the drawings, several embodiments of the invention will now be described. Initially referring to FIG. 1, a brake booster includes a shell 1 which comprises a front shell section 2 in the form of a stepped cup and a substantially dish-shaped rear shell section 3 which closes the opening of the shell section 2. The front shell section 2 has a diameter which stepwise and sequentially increases as one proceeds from its bottom toward its opening, thus including a portion 2A of a reduced diameter, a portion 2B of an intermediate diameter and a portion 2C of an increased diameter, the edge of which is formed as a cylindrical detent 2D having an increased diameter.

A front plate 5 which is also in the form of a stepped cup is fitted inside the front shell section 2, defining a front chamber 6 between the end wall surface of the front plate 5 and an opposite end wall surface of the front shell section 2.

The front plate 5 includes a tubular portion 5A which is a close fit inside the portion 2B having an intermediate diameter of the front shell section 2, and a flange 5B which extends radially outward from the right end of the tubular portion 5A. The flange 5B is disposed in overlapping relationship with an end face 2a, defining a step, of the portion 2B having an intermediate diameter of the front shell section 2, thus positioning the front plate 5 with respect to the front shell section 2.

A cup-shaped rear plate 7 is fitted inside the shell at a location inwardly recessed than the front plate 5, and has an end wall surface which defines a center chamber 8 together with an end wall surface of the front plate 5. The rear plate 7 includes a tubular portion 7A which is a close fit inside the section 2C having an increased diameter of the front shell section 2, and also includes a flange 7B which extends radially outward from the right end of the tubular portion 7A. The rear plate 7 is positioned relative to the front shell section 2 by superimposing the flange 7B in overlapping relationship with an end face 2b, defining a step, between the portion 2C having an increased diameter and the tubular detent 2D of the front shell section.

The rear shell section 3 includes a flange 3A around its outer periphery which extends radially outward. The flange 3A is fitted inside the tubular detent 2D of the front shell section 2 and is disposed in overlapping relationship with the flange 7B of the rear plate 7, whereby a rear chamber 9 is defined between a wall surface of the rear shell section 3 and an end wall surface of the rear plate 7.

Part of the tubular detent 2D is then bent radially inward to form a plurality of engaging pawls 2c, whereby the front shell section 2, the front plate 5, the rear plate 7 and the rear shell section 3 are integrally connected together.

A valve body 12 is slidably disposed within the shell 1 in axial alignment therewith. Along its outer periphery, the valve body 12 includes a portion 12A of an increased diameter, a portion 12B of an intermediate diameter and a portion 12C of a reduced diameter in the sequence named as one proceeds from the front to the rear side. Each of these portions extends through an opening formed in the plates 5, 7 and the rear shell section 3, respectively, in their axially central portions with a plurality of seal members 13 disposed between the individual openings and the valve body 12 to maintain a hermetic seal.

A front power piston 14, a center power piston 15 and a rear power piston 16 are disposed in the front chamber 6, the center chamber 8 and the rear chamber 9, respectively, and a front diaphragm 17, a center diaphragm 18 and a rear diaphragm 19 are applied to the back side of the respective power pistons 14 to 16, with the pistons 14 to 16 each connected to the valve body 12. In this manner, the interior of each of the chambers 6, 8 and 9 is divided into a constant pressure chamber A, C or E which is forwardly located thereof and a variable pressure chamber B, D or F which is rearwardly located thereof.

Formed axially within the valve body 12 are a first constant pressure passage 20 which provides a communication between the constant pressure chamber A of the front chamber 6 and the constant pressure chamber C of the center chamber 8 and a second constant pressure passage 21 which provides a communication between the constant pressure chamber A of the front chamber 6 and the constant pressure chamber E of the rear chamber 9.

The right end of the passage 20 communicates with an annular groove 12b which is formed in a stepped end face 12a defined between the portions 12A and 12B having an increased and an intermediate diameter of the valve body 12. A stepped cylindrical portion 15a extending toward the front side is formed on an axial portion of the center power piston 15, with a free end of the stepped cylindrical portion 15a which has a reduced diameter being positioned by being fitted around the inner peripheral surface of the annular groove 12b and in abutment against the bottom of the annular groove 12b.

Accordingly, the passage 20 communicates with the annular groove 12b on the outside of the stepped cylindrical portion 15a, and is always in communication with the constant pressure chamber C of the center chamber 8 through a clearance δ defined between the stepped end face 12a of the valve body 12 and the center power plate 15. It is to be noted that the outer peripheral surface of the annular groove 12b is formed with a plurality of axially extending, reinforcing ribs 12c which are formed at a given interval.

A bead 18a extending around the inner periphery of the center diaphragm 18 is fitted inside the stepped cylindrical portion 15a, thus preventing a communication of the passage 20 with the variable pressure chamber D. A retainer 22 is fitted around the valve body 12 to prevent the bead 18a from being disengaged from the stepped cylindrical portion 15a.

The right end of the other passage 21 is formed in substantially identical manner as the right end of the passage 20, and such arrangement is effective in reducing the axial dimension of the valve body 12.

Specifically, if a radial opening having a dimension corresponding to the clearance δ is formed in a portion of the valve body 12 which has the same diameter and the center power piston 15 is connected at a location rearward of such opening, the valve body 12 will be subject to a forward thrust from the center power piston 15, thus requiring an increased wall thickness for the valve body in a region located rearward of the opening to provide a sufficient strength.

By contrast, with the described arrangement of the invention, the clearance δ between the stepped end face 12a and the center power piston 15 corresponds to such an opening provided in the prior art, and dispenses with need for an increased wall thickness for a portion located rearward of the opening, thus allowing the axial dimension of the valve body to be reduced by a corresponding amount. Since the center power piston 15 is connected to a portion of the valve body having a reduced diameter which is located rearward of the stepped end face 12a, a sufficient strength for the connecting portion is assured.

When the center power piston 15 is connected to the valve body 12 within the annular groove 12b which is formed in the stepped end face 12a, such connecting region can be overlapped with a stroke of the seal member 13, allowing a further reduction of the actual size.

In the present embodiment, beads 17b, 18b and 19b extending around the outer perimeter of the respective diaphragms 17, 18, 19 are held between the front shell section 2 on one hand and the front plate 5, the rear plate 7 and the rear shell section 3 on the other hand, respectively. Specifically, the bead 17b extending around the outer perimeter of the front diaphragm 17 is held between a stepped end face 2c defined between the portions 2A and 2B having a reduced diameter and an intermediate diameter of the front shell section 2 and an end face 5a of the front plate 5 which is located to the left of the portion 5A having a reduced diameter in opposing relationship with the stepped end face 2c, thus maintaining a hermetic seal in this region. A radially inward portion of the end face 5a projects toward the stepped end face 2c in an annular form, thereby additionally assuring the hermetic seal.

The bead 18b extending around the outer perimete of the center diaphragm 18 is received in an annular groove 7b located radially inward of a stepped end face 7a of the rear plate 7 and opening in the radially outward direction. The bead 18b is held between the inner peripheral surface of the groove 7b and the inner peripheral surface of the portion 5A having a reduced diameter in the region of the front plate 5, thus maintaining a hermetic seal thereat.

Finally, the bead 19b extending around the outer perimeter of the rear diaphragm 19 is received in an annular groove 3B formed in the outer periphery of the rear shell section 2 and opening in the radially outward direction, and is held between the inner peripheral surface of the groove 3B and the inner peripheral surface of the cylindrical portion 7A of the rear plate 7, thus maintaining a hermetic seal thereat.

A valve mechanism 23 which is known in itself is contained within the valve body 12, and comprises an annular, first valve seat 24 formed on the valve body 12, an annular, second valve seat 26 formed on the right end of a valve plunger 25 which slidably extends through the valve body and located radially inward than the first valve seat 24, and a valve element 28c which is urged by a spring 17, located to the right thereof, so as to be seated upon either valve seat 24 or 26.

A space located radially outward of an annular seal defined by the engagement between the first valve seat 24 and the valve element 28 communicates with the constant pressure chamber A of the front chamber 6 and the constant pressure chamber E of the rear chamber 9 through the second constant pressure passage 21 which is formed in the valve body 12. The constant pressure chamber A communicates with a source of negative pressure such as an intake manifold, not shown, through a piping 32 mounted on the front shell section 2 for introducing a negative pressure. The negative pressure which has been introduced into the constant pressure chamber A is normally introduced into the constant pressure chamber C of the center chamber 8 and the variable pressure chamber E of the rear chamber 9 through the respective constant pressure passages 20, 21.

A space located radially inward of an annular seal defined by the engagement between the first valve seat 24 and the valve element 28 and located radially outward of another annular seal defined by the engagement between the second valve seat 26 and the valve element 28 or a space located intermediate the both annular seals, communicates with the variable pressure chamber D of the center chamber 8 through a first variable pressure passage 33 which is radially formed in the valve body 12. An axially extending, second variable pressure passage 34 which communicates with the variable pressure chamber B of the front chamber 6 and an axially extending, third variable pressure passage 35 which communicates with the variable pressure chamber F of the rear chamber 9 communicate with the valve mechanism 23 through the first variable pressure passage 33.

Consequently, the variable pressure chambers B, D and F communicate with each other through the three variable pressure passages 33 to 35, with the first passage 33 communicating with the centrally located variable pressure chamber D having a minimum channel length and the passages 34 and 35 communicating with the variable pressure chambers B and F which are located on the opposite sides of the chamber D being located on the opposite sides of the first passage 33 and having a substantially equal channel length. In other words, the respective variable pressure passages 33 to 35 allow the valve mechanism 23 to communicate with the individual variable pressure chambers B, D and F with a minimum channel length.

As a consequence, when the variable pressure passage which provides a communication between the rear side variable pressure chamber F and the valve mechanism 23 is designed to exhibit a minimum length, with respective variable pressure passages connecting this chamber F with each of the front side variable pressure chamber B and the centrally located variable pressure chamber D, it will be seen that while the channel length between the front side, variable pressure chamber B and the rear side, variable pressure chamber F increases, such channel length can be substantially halved with the described arrangement, thus allowing a flow resistance to be reduced.

Finally, a space located radially inward of the annular seal defined by the engagement between the second valve seat 26 and the valve element 28 communicates with the atmosphere through an axially extending pressure passage 36 and a filter 37.

The right end of the valve plunger 25 which is slidably disposed within the valve body 12 is mechanically coupled to an input shaft 38 which is associated with a brake pedal, not shown, while its left end is disposed in opposing relationship with a right end face of a reaction disc 40 which is received in a recess 39a formed in one end of a push rod 39. The left end of the push rod 39 slidably extends through the axial portion of the front shell section 2 and through a seal member 41 to the outside of the shell for connection with a piston of a master cylinder, not shown. The valve body 12 is normally maintained in its inoperative position shown by a return spring 42.

A key member 43 is provided to prevent the valve plunger 25 from being disengaged from the valve body 12. The key member 43 is displaceable in the axial direction of the valve body 12 and its opposite ends project beyond the peripheral surface of the valve body 12 so as to abut against the rear plate 7 in the inoperative condition of the brake booster. Under this condition, the key member 43 restricts a free retracting movement of the valve plunger 25 with respect to the valve body 12, and allows an immediate flow path switching action of the valve mechanism 23 whenever a brake pedal is depressed to drive the input shaft 38c to the left, thus allowing a lost motion of the input shaft 38 to be reduced.

When an arrangement is made so that the key member 43 abuts against the rear plate 7 inside the shell 1, any sound of percussion generated as a result of the abutment of the key member 43 against the rear plate 7 and which will be transmitted to the exterior of the shell can be minimized.

The operation of the above arrangement will now be described. Under an inoperative condition where there is no depression of a brake pedal, the valve body 12 is maintained at its right-hand or retracted position by means of the return spring 42, whereby the key member 43 stands still in abutment against the rear plate 7. The key member 43 causes the valve plunger 25 which is engaged therewith to be driven forward relative to the valve body 12, so that whenever the brake pedal is depressed to drive the input shaft 38 to the left, a flow path within the valve mechanism 23 can be immediately switched.

In the inoperative condition mentioned above, the valve element 28 is seated upon the second valve seat 26 formed on the valve plunger 25 to close the pressure passage 36 communicating with the atmosphere, and is also slightly spaced away from the first valve seat 24 to allow the variable pressure passages 33 to 35 to communicate with the constant pressure passage 21, whereby a negative pressure is introduced into all of the chambers A to F within the shell 1.

If the brake pedal is now depressed to drive the input shaft 38 to the left, the valve element 28 will be immediately seated upon the first valve seat 24 while moving away from the second valve seat 26. Accordingly, the communication between the constant pressure passage 21 and the respective variable pressure passages 33 to 35 will be interrupted as is the communication between the constant pressure chambers A, C and E and the variable pressure chambers B, D and F while introducing the atmosphere into the individual variable pressure chambers B, D and F.

Thereupon, a pressure differential is developed between the respective constant pressure chambers A, C and E and the respective variable pressure chambers B, D and F, whereby the individual power pistons 14 to 16 are driven to the left integrally with the valve body 12, causing the push rod 39 to move forward, which would cause a master cylinder, not shown, to produce a braking liquid pressure for actuating a brake.

If the brake pedal is now released under this braking condition, the fluid path within the valve mechanism 23 will be switched to interrupt the communication between the variable pressure chambers B, D and F and the atmosphere while allowing the variable pressure chambers B, D and F to communicate with the constant pressure chambers A, C and E, whereby the atmosphere contained within the respective variable pressure chambers B, D and F will be vented to a source of negative pressure, not shown, through the constant pressure chamber A.

It will be appreciated that the individual variable pressure passages 33 to 35 will allow the valve mechanism 23 to communicate with the individual variable pressure chambers B, D and F with a minimum channel length, so that the atmosphere is rapidly displaced or expelled from these variable pressure chambers, thus preventing any lag in terminating the operation of the brake booster.

Figure 3:
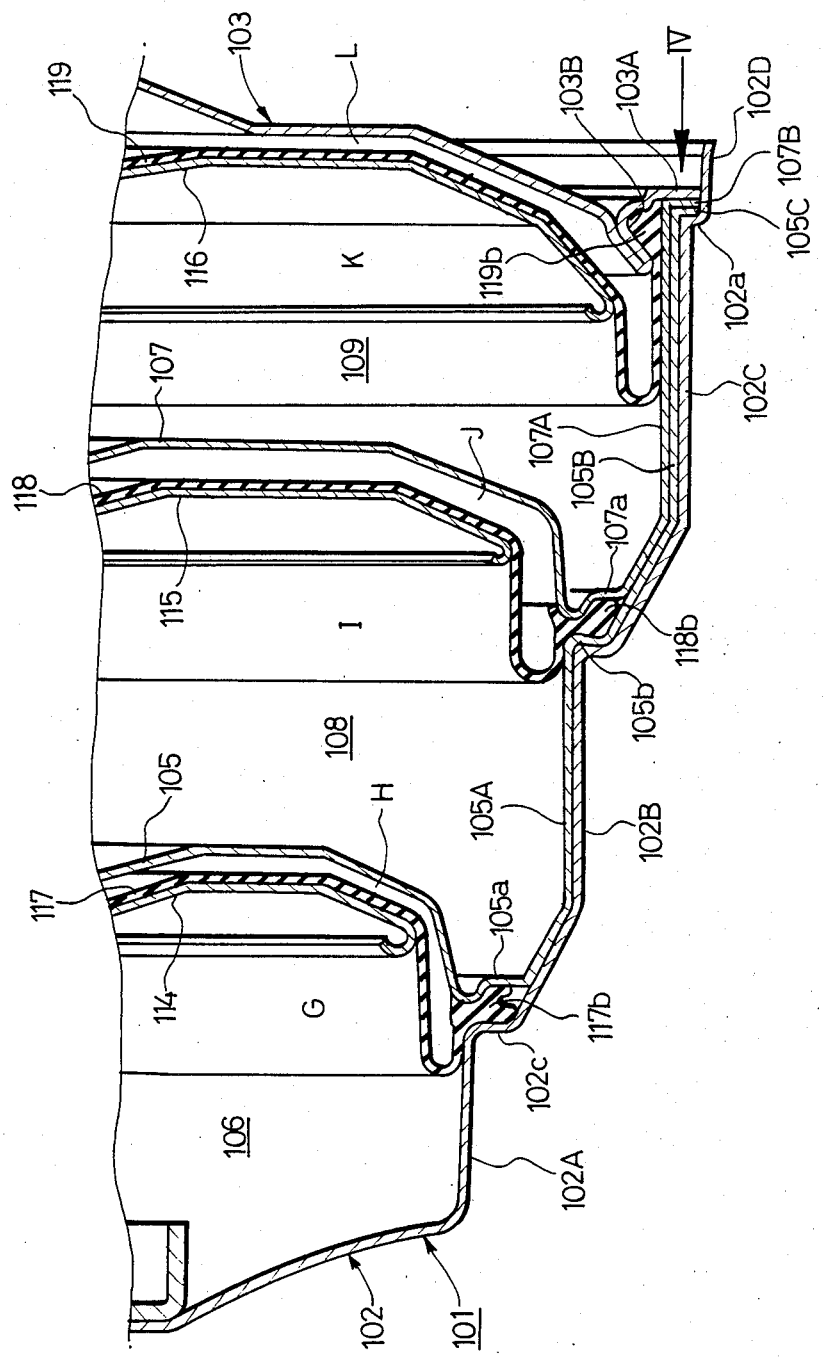
FIG. 3 is a longitudinal section of part of another embodiment of the invention.

FIG. 3 shows another embodiment which employs a different connection between the shell and the plates from that of the above mentioned embodiment. In this embodiment, a front plate 105 is extended rearwardly or to the right to the position of a rear shell section 103, with its end being formed with a flange 105C which extends radially outward. The front plate 105 is sequentially formed with a portion 105B of an increased diameter and another portion 105A of a reduced diameter, which are sequentially disposed in a direction away from the flange 105C and which conform to the configuration of the inner periphery of a front shell section 102. It is to be noted that the flange 105C, and the portions 105B and 105A of the front plate 105 are a close fit against the inner peripheral surface and the stepped end face of the front shell section 102.

A bead 117b extending around the outer perimeter of a front diaphragm 117 is held between a stepped end face 102c of the front shell section 102 and an end face 105a of the front shell 105 in the similar manner as in the previous embodiment, thereby dividing the interior of a front chamber 106 into a forwardly located, constant pressure chamber G and a rearwardly located variable pressure chamber H.

A bead 118b extending around the outer perimeter of a center diaphragm 118 is held between a stepped end face 105b disposed between the portions 105A and 105B having different diameters of the front plate 105 and an end face 107a located to the left of a tubular portion 107A of a rear plate 107 and disposed in opposing relationship with the end face 105b, thus maintaining a hermetic seal in this region and dividing the interior of a center chamber 108 into a forwardly located, constant pressure chamber I and a rearwardly located, variable pressure chamber J. The radially inward portions of the end faces 105b and 107a project toward each other in an annular form, thereby achieving a reliable hermetic seal.

A bead 119b extending around the outer perimeter of a rear diaphragm 119 is received in an annular groove 103B formed around the outer periphery of a rear shell 103 and opening in the radially outward direction, and is held between the inner peripheral surface of the groove 103b and the inner peripheral surface of the tubular portion 107A of the rear plate 107 to maintain a hermetic seal in this region while dividing the interior of a rear chamber 109 into a forwardly located, constant pressure chamber K and a rearwardly located, variable pressure chamber L. In the embodiment shown in FIG. 3, parts corresponding to those shown in FIG. 1 are designated by like reference numerals, to which 100 is added.

Figure 5:
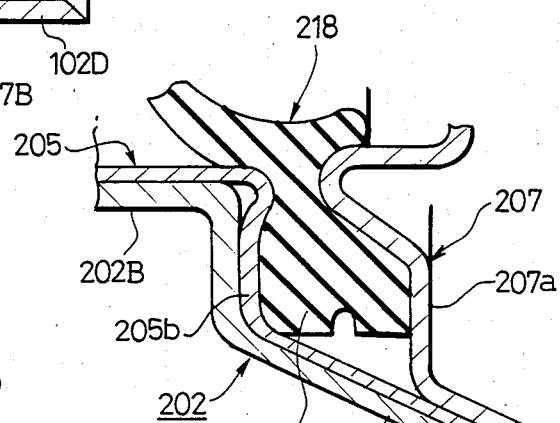
FIGS. 5 and 6 are sections of part of other embodiments of the invention.
Figure 6:
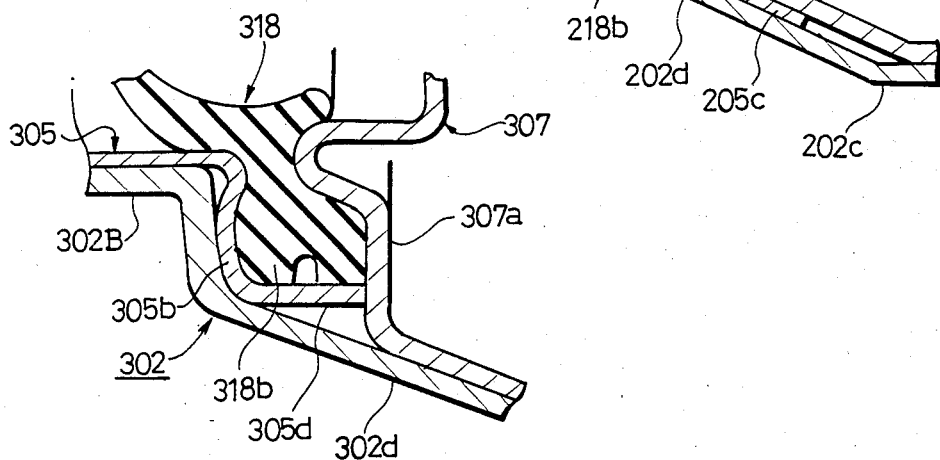

FIGS. 5 and 6 show further embodiments of the invention. In the embodiment shown in FIG. 5, a front plate 205 is formed, in a region of a bead 218b extending around the outer perimeter of a center diaphragm 218, with a tapered portion 205c which extends in conformity to the inner surface of a tapered portion 202d of a front shell section 202 which is defined between its portion 202B having an intermediate diameter and its portion 202C having a reduced diameter, and the tapered portion 205c is severed at its end having a greater diameter, thus removing its portion which will be located to the right thereof. The end of the tapered portion 205C is held between the inner peripheral surface of the tapered portion 202d of the front shell section 202 and the outer peripheral surface of a rear plate 207 so that the front plate 205 may be secured against the inner surface of the tapered portion 202d of the front shell section 202.

In other respects, parts corresponding to those shown in FIG. 3 are designated by like reference numerals as used before, to which 100 is added.

In the embodiment shown in FIG. 6, a right-hand portion of a front plate 305 is severed and omitted at a similar position as indicated in FIG. 5. However, instead of forming a portion corresponding to the tapered portion 205c, such portion is formed as a cylinder portion 305d, with its right end face being supported by an end face 307a of a rear plate 307. Parts shown in FIG. 6 which correspond to corresponding parts shown in FIG. 5 are designated by like reference numerals as before, to which 100 is added.

It should be understood that in other respects, the embodiments shown in FIGS. 3, 5 and 6 are constructed in the similar manner as the embodiment shown in FIG. 1.

Having described the invention in connection with several embodiments thereof, it should be understood that these embodiments are exemplary only and that a number of changes, modifications and substitutions therein will readily occur to one skilled in the art from the above disclosure without departing from a scope and spirit of the invention defined by the appended claims.

What is claimed is:

1. A brake booster comprising a shell; a front plate and a rear plate fixedly mounted inside the shell for dividing the interior of the shell into a front chamber, a center chamber and a rear chamber; a valve body slidably extending through the front plate and the rear plate; a front power piston, a center power piston and a rear power piston disposed within the front chamber, the center chamber and the rear chamber, respectively, and connected to the valve body; a front diaphragm, a center diaphragm and a rear diaphragm applied to the back side of the front power piston, the center power piston and the rear power piston, respectively, for dividing the interior of each of the front chamber, the center chamber and the rear chamber into a forwardly located, constant pressure chamber and a rearwardly located, variable pressure chamber; a constant pressure passage disposed to provide a communication between the constant pressure chambers formed in the front chamber, the center chamber and the rear chamber; a variable pressure passage disposed to provide a communication between these variable pressure chambers formed in the front chamber, the center chamber and the rear chamber; a valve mechanism received within the valve body for switching a communication between the constant pressure chambers, the variable pressure passage and a pressure passage which supplies pressure fluid; and an input shaft operatively associated with a brake pedal to be driven in a reciprocatory manner to cause the valve mechanism to switch a flow path therein in response thereto; wherein the variable pressure passage comprises a first variable pressure passage which provides a communication between the variable pressure chamber of the center chamber and the valve mechanism, a second variable pressure passage which provides a communication between the variable pressure chamber of the front chamber and the valve mechanism, and a third variable pressure passage which provides a communication between the variable pressure chamber of the rear chamber and the valve mechanism, the first variable pressure passage having a channel length which is less than that of the remaining variable pressure passages.

2. A brake booster according to claim 1 in which the constant pressure passage comprises a first constant pressure passage which is axially formed in the valve body to provide a communication between the constant pressure chambers of the front and the center chamber, and a second constant pressure passage which is axially formed in the valve body to provide a communication between the constant pressure chambers of the front and the rear chamber.

3. A brake booster according to claim 1 in which a rear end of the constant pressure passage communicates with an annular groove formed in a stepped end face of the valve body which is disposed within one of the constant pressure chambers, at lease one of said power piston including a cylindrical portion which projects from its inner periphery toward the front side, and a free end of which is fitted over the inner peripheral surface of the annular groove, with a free end of the cylindrical portion being positioned in abutment against a front side bottom of the annular groove, the constant pressure passage being maintained in communication with said one constant pressure chamber through a clearance defined between a rear end face of the annular groove and the power piston.

4. A brake booster according to claim 3 in which an outer peripheral surface of the annular groove is formed with an axially extending, reinforcing rib.

5. A brake booster according to claim 1 in which the shell comprises a cup-shaped, front shell section and a rear shell section closes the opening of the front shell section, a bead extending around the outer perimeter of the front diaphragm being held between the front shell section and the front plate, a bead extending around the outer perimeter of the center diaphragm being held between the front plate and the rear plate, and a bead extending around the outer perimeter of the rear diaphragm being held between the rear plate and the rear shell section.

6. A brake booster according to claim 1 in which the front plate is held between and supported by a front shell section and the rear plate, and the rear plate is held between and supported by the front shell section and a rear shell, section the rear shell section being connected to the front shell section to connect the front shell section, the front plate, the rear plate and the rear shell section together in an integral manner.

7. A brake booster according to claim 1 in which the front plate is held between and supported by a front shell section and the rear plate, the rear plate being held between and supported by the front plate and a rear shell section, the rear shell section being connected to the front shell section to connect the front shell section, the front plate, the rear plate and the rear shell section together in an integral manner.

* * * * *

UNITED STATES PATENT AND TRADEMARK OFFICE
CERTIFICATE OF CORRECTION

PATENT NO. : 4 984 507
DATED : January 15, 1991
INVENTOR(S) : Haruo Suzuki et al It is certified that error appears in the above-identified patent and that said Letters Patent is hereby corrected as shown below:

In the title: change "PASSAGES" to ---PASSAGE---.
Column 11, line 40; change "lease" to ---least---.
Column 12, line 15; after "section" insert ---which---.
Column 12, line 29; change "shell, section the" to
---shell section, the---.

Signed and Sealed this

Seventeenth Day of November, 1992

Attest:

DOUGLAS B. COMER

*Attesting Officer*  *Acting Commissioner of Patents and Trademarks*